United States Patent Office 3,739,021
Patented June 12, 1973

3,739,021
CONTINUOUS PREPARATION OF
NITROLOTRIACETIC ACID
William Jennings Peppel, Heinz Schulze, and Edward
Thomas Marquis, Austin, Tex., assignors to Jefferson
Chemical Company, Inc., Houston, Tex.
No Drawing. Filed Aug. 19, 1971, Ser. No. 173,317
Int. Cl. C07c 101/20
U.S. Cl. 260—531 C          4 Claims

ABSTRACT OF THE DISCLOSURE

A falling-film reactor is employed to provide a continuous process for preparing nitrilotriacetic acid (NTA) and its salts from triethanolamine (TEA) in the presence of alkali metal hydroxides and cadmium salts. Temperatures greater than the melting point of cadmium metal are employed.

This invention relates to a continuous process for preparing NTA and its salts from TEA. In particular this invention relates to a continuous process for preparing NTA and its salts from TEA in a falling-film reactor at temperatures greater than the melting point of cadmium metal.

To our knowledge there has not been described in the prior art any continuous process for preparing NTA from TEA in the presence of alkali metal hydroxides and cadmium salts.

Heretofore, all the processes described for preparing NTA from TEA in the presence of alkali metal hydroxides and cadmium salts were batch processes. Without known exception, these prior batch processes reflect several important beliefs regarding the conversion of TEA to NTA by this reaction. Firstly, it was believed that high reaction temperatures must be avoided because of the general thermal instability of aminocarboxylic acids and their salts. Secondly, it was believed that long reaction times on the order of hours were needed. Thirdly, the separation of cadmium metal as the reaction progressed, with resulting fouling of the reaction vessel, seemingly ruled out consideration of any but a batch process.

Reference to the following sources will clearly substantiate these facts: U.S. Pats. Nos. 2,384,816; 2,384,817; 2,384,818; 3,535,373; 3,535,374; 3,535,375; 3,578,709 and to Dwyer & Mellor, "Chelating Agents and Metal Chelates," Academic Press, New York, 1964, at page 287.

With the recent advent of environment conservation and ecology awareness, renewed interest has been shown in the use of NTA salts in detergent formulations. Accordingly, a fast continuous process for preparing NTA and its salts has commercial applicability and would be a significant and important achievement.

It is evident that those processes described in the prior art for preparing NTA from TEA do not represent such an achievement and are not particularly suited for commercial operation because of their prolonged reaction times and their batch nature.

In spite of the above beliefs and knowledge, and in contradistinction to the teachings of the prior art, we discovered a process for preparing NTA from TEA in high yields that was not only continuous but was further accomplished by using reaction times and temperatures that are truly surprising when compared to the prior art. Because of our discovery, NTA and its salts can now be prepared from TEA quickly, economically and on a continuous basis.

Therefore, in accordance with our invention, NTA and its salts are prepared continuously in a falling-film reactor by heating TEA in the presence of alkali metal hydroxide and cadmium salts at temperatures sufficient to liquefy cadmium metal.

Reaction times range in the order of fractions of a second to several seconds. Reaction times will generally fall within the range of about 1 to 30 seconds and reaction times in the range of about 4 to 15 seconds are usually practiced.

A minimum temperature of at least 325° C., the melting point of cadmium, is employed. Very high temperatures, such as those greater than 400° C., are not necessary and temperatures in the range of about 325° C. to 400° C. can be suitably employed. Preferably, temperatures in the range of about 325° C. to 375° C. are employed.

Pressures can be suitably maintained by regulation of the escape of the evolved hydrogen from the reaction. Pressures will generally fall within the range of about 500 to 3,000 p.s.i.g. The upper pressure limits are generally dictated by economic factors. It is presently preferred that at least 1,000 p.s.i.g. pressure be maintained throughout the system, and most preferably, at least 2,000 p.s.i.g. pressure be maintained.

Cadmium salts, such as the acetate, propionate, butyrate, oxide, chloride, sulfate, admixtures thereof, and the like, are representative catalysts and can be suitably employed in amounts effectively determined by the skilled artisan. Generally, an effective amount is within the practical range of about 1 to 30 grams of cadmium salt per mol of TEA. Preferably, from about 10 to 20 grams of cadmium salt per mol of TEA is employed. Larger amounts of catalysts can be employed, if desired, but economic factors, such as recovery costs, would discourage such use. The cadmium salt dissolves readily in the reaction mixture on heating and presumably is in the form of a complex compound with triethanolamine.

The conversion of TEA to NTA is conducted in the presence of alkali metal hydroxides, and admixtures thereof, such as sodium hydroxide, potassium hydroxide, and the like, which are generally employed in amounts to provide at least a stoichiometric quantity relative to the TEA, although excess alkali metal hydroxides are usually provided. Sufficient water is also employed to essentially maintain the NTA salts in solution.

Essentially any conventional type of falling-film reactor is suitable for use in our invention. Typical reactors of varying complexity can be used, such as those described in U.S. Patent Nos. 2,923,728; 3,169,142; 3,270,038; 3,427,342 or 3,350,428, which disclosures are herein incorporated by reference thereto.

Although the order of mixing the components is not critical, it is convenient to premix the TEA, water, cadmium catalyst and alkali metal hydroxide. A homogeneous solution is obtained at 110–130° C. This admixture can then be employed as a single feed for charging to the falling-film reactor. Since a film of this feed will be formed on the reactor walls, which are heated to a relatively high temperature, it is advantageous to preheat the feed mixture prior to charging it to the reactor. As the feed mixture is passed downward as a film on at least one inner wall of the downward inclined tube-type reactor, the temperature of said reactor wall is maintained at a temperature sufficient to melt the cadmium metal which separates as the reaction progresses. The falling-film reactor is provided with a bottom-collection reservoir that is likewise maintained at the conditions above described. The reservoir is simply provided with an outside means for drawing off the layer of liquid product to separate it from the lower layer of molten cadmium. Molten cadmium can, if desired, be continuously withdrawn as well.

NTA and its salts can be recovered from the product effluent by conventional means, the effluent yielding the free acid upon acidification.

As is evident, operation according to our process permits rapid preparation of NTA while avoiding fouling of the reaction vessel surfaces by deposits of solid metallic cadmium. Accordingly, the temperatures employed also provide a means for recovering the cadmium in high yields.

Illustrative of the foregoing discussion and description and not to be interpreted as a limitation on the scope thereof or on the materials herein employed, the following examples are presented.

EXAMPLE I

A mixture of 289 parts by weight triethanolamine, 390 parts by weight sodium hydroxide, 438 parts by weight water and 26.3 parts by weight cadmium oxide were admixed and preheated in a feed tank to 124° C. This mixture formed a homogeneous, nearly colorless solution, at a temperature around 110° C.

An 18-inch long falling-film reactor constructed of schedule 80 one-inch Monel pipe (inside diameter 0.957 inch) was preheated to about 342° C. The homogeneous solution described above was pumped hot at a temperature greater than 100° C. with a heated metering pump at a rate of about 2.1 lbs./hr. The top and bottom sections of the reactor were maintained at a temperature between 342° C. and 349° C. The reactor tube was connected directly to a copper-lined one-gallon stainless steel autoclave which served as the product receiver collection reservoir. The off-gas, mainly hydrogen, was vented from the top of the receiver through a knock-out pot, filter, and pressure controller to a gas meter. Pressure in the reactor tube and receiver was maintained at 2,600 p.s.i.g.

The product-containing effluent mixture was removed from the receiver and filtered through a sintered glass filtering funnel. The clear filtrate was acidified to a pH of 0.3 using concentrated hydrochloric acid. The precipitated nitrilotriacetic acid was heated to 90° C. with stirring and then cooled in ice. The NTA was collected on a sintered funnel and washed successively with water until the filtrate was chloride free. Several cold methanol washes removed most of the remaining water. The white NTA was dried in an oven at 125° C. and amounted to a yield of 82.5% on the basis of the triethanolamine charged.

EXAMPLE II

Example I was repeated using the same reactor and procedures described therein except that the temperature of the reactor was maintained between 315° C. and 321° C. The NTA yield fell to 41.6%.

Our process can be repeated with similar success by substituting in the examples the generically and specifically described reactants and conditions of this invention for those employed in the specific embodiment. As will be evident to those skilled in the art, various modifications of the invention can be made or followed in light of the discussion and disclosure herein set forth without departing from the spirit or the scope thereof.

What is claimed is:

1. A continuous process for preparing nitrilotriacetic acid salts from triethanolamine in the presence of alkali metal hydroxides and cadmium salts comprising passing triethanolamine into a reaction zone and therein heating triethanolamine in the presence of (a) alkali metal hydroxides which are sufficiently provided in at least stoichiometric quantity relative to said triethanolamine, and (b) cadmium salts sufficient to provide about 1 to 30 grams of cadmium salt per mol of triethanolamine at a temperature of about 325° C. to 400° C. at a pressure within the range of about 500 to 3,000 p.s.i.g. and for a time in the range of about 1 to 30 seconds, wherein said rotation zone comprises a falling-film reactor.

2. The process according to claim 1 wherein said heating is conducted at a pressure of at least 2,000 p.s.i.g. at a temperature in the range of 325° C. to 375° C.

3. The process according to claim 2 wherein said heating is conducted for a time in the range of about 4 to 15 seconds.

4. The process according to claim 3 wherein said cadmium salt is cadmium oxide, and wherein said falling-film reactor is provided with a means for separately drawing off an upper layer of liquid product and a lower layer of molten cadmium.

References Cited

UNITED STATES PATENTS 3,578,709    5/1971    Bishop et al. _____ 260—534 E
3,121,728    2/1964    Bartlett et al. _____ 260—531 C

OTHER REFERENCES

Levenspiel: "Chemical Reaction Engineering," J. Wiley & Sons, Inc. (1962), pp. 94–98.

LORRAINE A. WEINBERGER, Primary Examiner

J. F. TERAPANE, Assistant Examiner